May 22, 1956  B. STAHMER  2,746,570
TRAILER SAFETY DEVICE
Filed Aug. 17, 1951  3 Sheets-Sheet 1
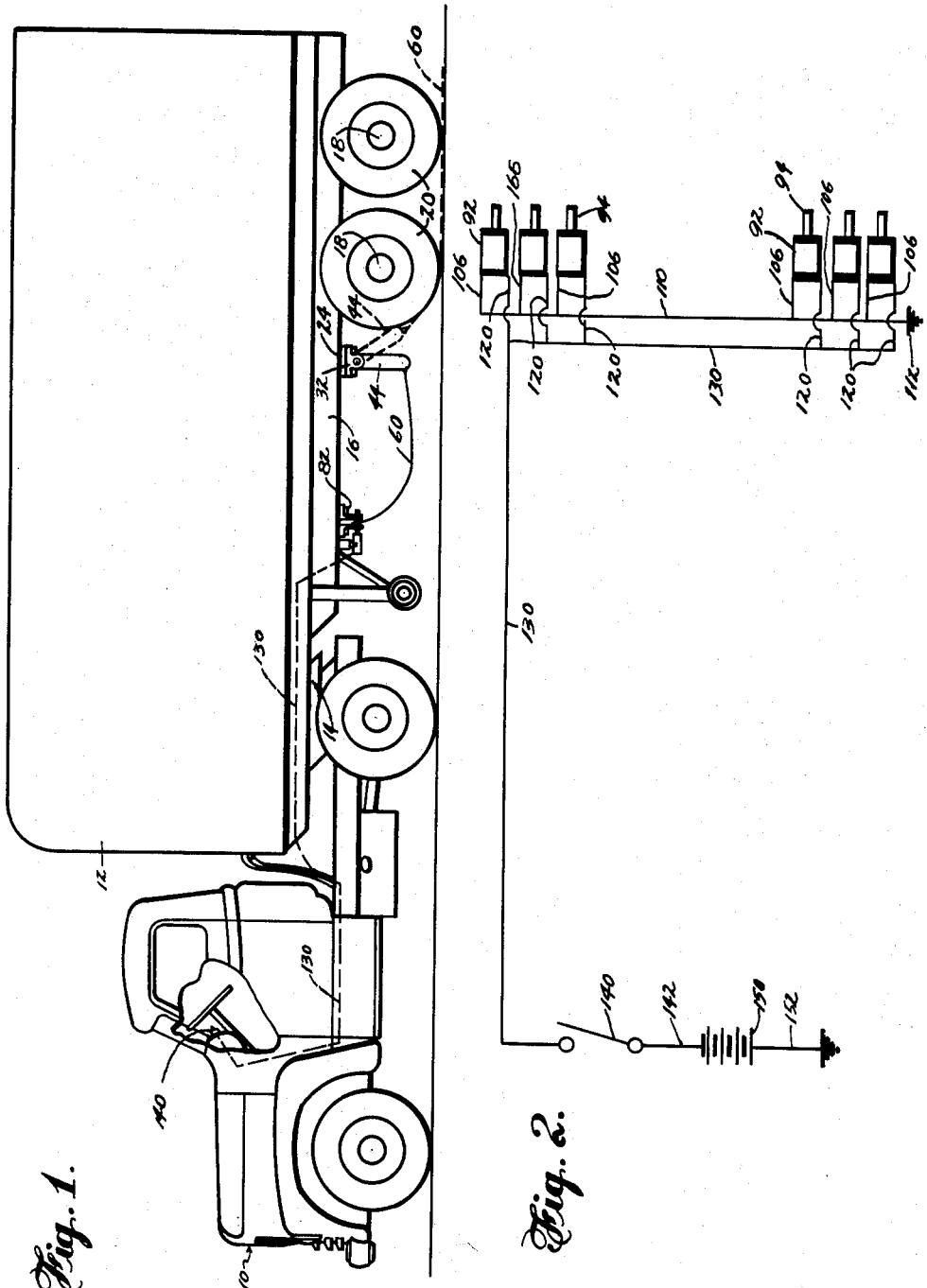
INVENTOR.
Bernhardt Stahmer
BY
A. Hiram Sturges May 22, 1956 — B. STAHMER — 2,746,570
TRAILER SAFETY DEVICE
Filed Aug. 17, 1951 — 3 Sheets-Sheet 2

INVENTOR.
Bernhardt Stahmer
BY

May 22, 1956
B. STAHMER
2,746,570
TRAILER SAFETY DEVICE
Filed Aug. 17, 1951
3 Sheets-Sheet 3
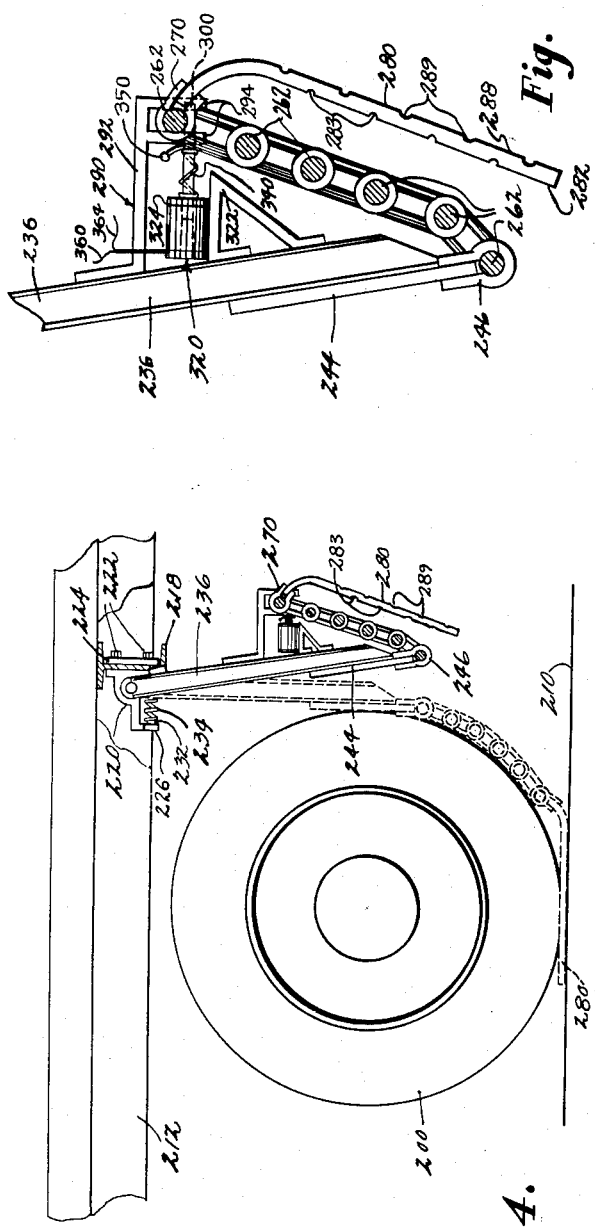
Fig. 5.
Fig. 4.
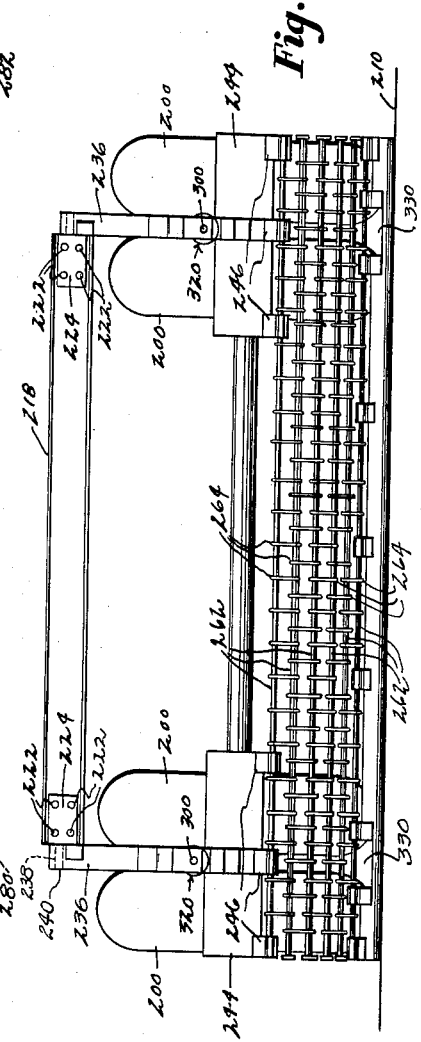
Fig. 6.
INVENTOR.
Bernhardt Stahmer
BY

United States Patent Office 2,746,570
Patented May 22, 1956

2,746,570

TRAILER SAFETY DEVICE

Bernhardt Stahmer, Omaha, Nebr.

Application August 17, 1951, Serial No. 242,312

2 Claims. (Cl. 188—4)

This invention relates to safety devices, and more particularly to a safety device for use with trailers of the type towed by trucks or other vehicles at relatively high speeds.

At present trailers of the type commonly known as "semi-trailers" are provided with brakes on each of their wheels, the brakes being controllable from the operator's cab by compressed air, hydraulic cylinders, or electromechanical devices. Whatever means of remote control is used to operate the brakes it is necessary to connect the brakes to the controls by disconnectable tubular lines or electrical wires.

Often at times when the towing vehicle and the trailer are traveling at high speeds and the operator desires to slow down or stop, the brakes on the trailer fail to operate although the towing vehicle brakes respond to the controls. However, sometimes neither the trailer nor the vehicle brakes will respond to the controls. In the case of the former the failure of the trailer brakes to operate is most usually due to a break in an airline or to a disconnected airline.

Under these conditions the trailer and vehicle will "run away" and subsequently will "jackknife," a well known situation wherein inertia causes the trailer to overtake the towing vehicle going to one side or over the top of the towing vehicle. An accident of this nature often results in death to the operator and a large amount of property damage.

Therefore, it is the principal object of this invention to provide a safety device which will stop a trailer that is traveling at a high speed, whereby the trailer will itself safely stop the rest of the assembly, thus reducing "run away" and "jack-knife" type of accidents.

It is another object to provide a safety device of the type described that will be controllable by the operator from the vehicle cab.

Yet another object is to provide such a safety device designed so that it may be controlled electrically so that only one wire between the trailer and the towing vehicle is needed.

Yet another object of the invention is to provide a device for the purpose described which is sturdy and durable in construction, reliable and efficient in operation, and relatively simple and inexpensive to manufacture, assemble and utilize.

Other and further objects and advantages of the present invention will be apparent from the following detailed description, drawings and claims, the scope of the invention not being limited to the drawings themselves as the drawings are only for the purpose of illustrating a way in which the principles of this invention can be applied.

Other embodiments of the invention utilizing the same or equivalent principles may be used and structural changes may be made as desired by those skilled in the art without departing from the present invention and the purview of the appended claims.

Figure 1 is a side elevation view of a truck and trailer of the type known as a "semi-trailer and tractor." A portion of the vehicle cab is broken away showing the controls, and a portion of the wiring and the position of the safety device when the device is in operation are shown in dotted lines.

Figure 2 is a wiring diagram of the controls of this invention.

Figure 4 is a side elevation of another modification of the safety device of this invention, being shown in braking position in dotted lines.

Figure 5 is an enlarged view of the lower portion of the device in retracted position.

Figure 6 is a frontal elevation of the device in braking position.

Figure 3:
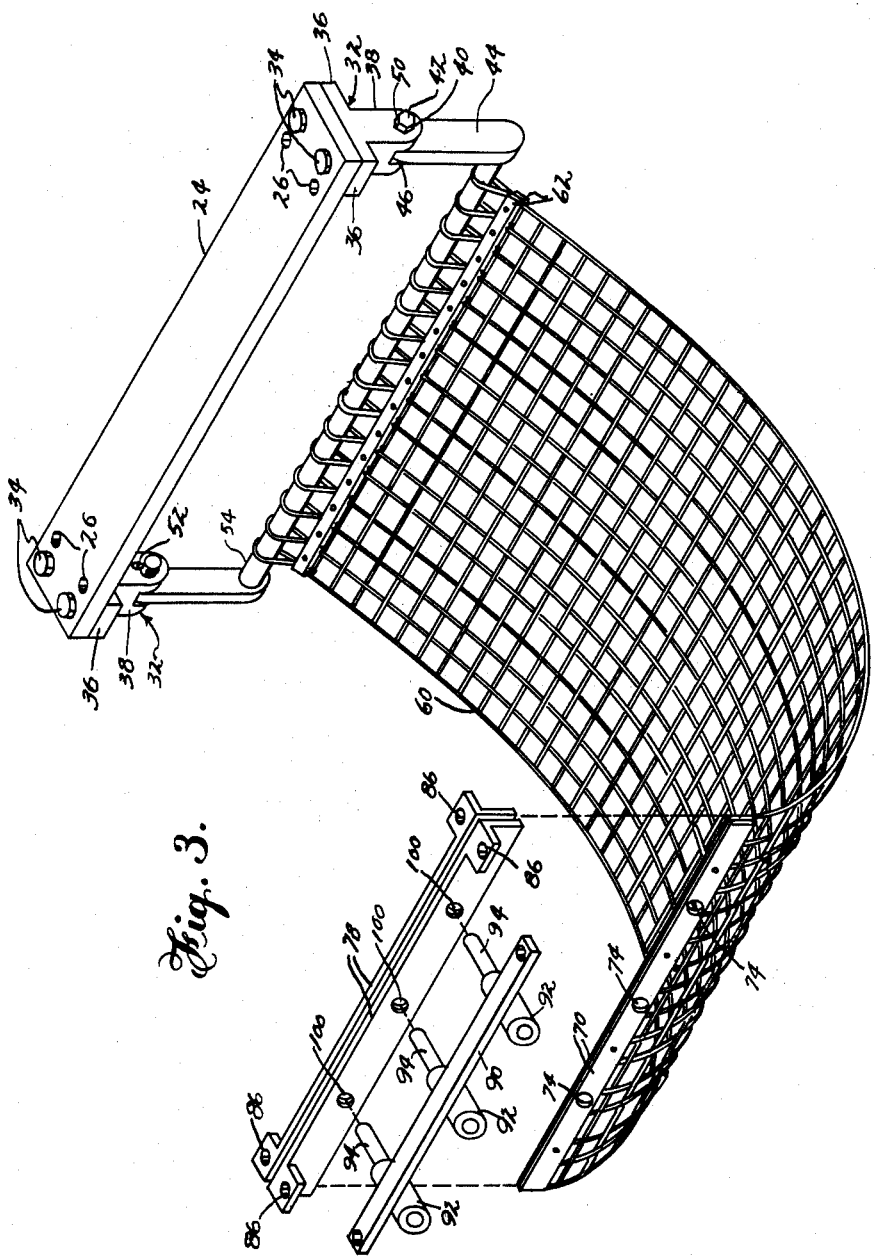
Figure 3 is a pictorial view of the trailer safety device of this invention, the controls and wiring not being shown.

Referring now to the drawings in detail, and as is best seen in Figure 1, a truck or towing vehicle 10 is shown coupled to a semi-trailer 12 by a standard coupling 14.

The trailer 12 has a plurality of parallel longitudinally disposed beams 16 at the bottom thereof, the latter being supported by the axles 18 of two or more laterally spaced apart wheels 20 which latter are rotatably mounted thereon.

At a point slightly forward of the forward two of the wheels 20 a transversely disposed cross member 24 is securely attached to the underside of the beams 16. The cross member 24 extends across the entire width of the underside of the trailer 12 and has a plurality of vertical apertures 26 therethrough for mounting to the trailer 12.

A pair of clevices 32 are secured to the underside of each end of the cross member 24 by bolts 34 through forwardly and rearwardly extending ears 36, and are laterally spaced apart a distance slightly greater than the width of the wheels 20. Each of the clevices 32 are provided with a downwardly extending bifurcated portion 38, which latter has a normally horizontal transversely disposed aperture 40 therethrough for receiving a pin 42.

Each of a pair of normally vertical swinging arms 44 have a transversely disposed aperture 46 through their upper ends, the aperture being axially aligned with the apertures 40, and the walls of the aperture are rotatably disposed about the pin 42 between the bifurcated ends 38 of the clevices 32 for forward and rearward pivoting motion of the arms 44.

Each of the pins 42 have one end 50 burred and the other end secured by a cotter key 52.

The lower ends of the arms 44 are connected to each other by an elongated normally horizontal transversely disposed rod 54.

A rectangularly shaped mat 60 is provided. The mat 60 is shown in Figure 3 and serves to illustrate the intent. The mat is flexible and can be formed in any suitable manner.

The mat 60 has one of its end looped around the rod 54 and secured in place by two elongated strips 62. The strips 62 are disposed one on each side of the mat 60, and are riveted together.

The forward end of the mat 60 has two strips 70 disposed on opposite sides thereof, the strips 70 being riveted together and being similar to the strips 62. The strips 70 are provided with spaced apart apertures 74.

A yoke is provided for receiving the strips 70. The yoke comprises two oppositely disposed bars 78. The bars 78 are spaced apart sufficiently for receiving the strips 70 and are arranged transversely across the under side of the trailer, being suitably secured by bolts 82 and apertured ears 86 to the frame members 16 on the under side of the trailer.

A transversely disposed bar 90 is provided for supporting a plurality of solenoids 92. The solenoids 92 have cores 94 removably disposable in spaced apart apertures 100 on the bars 78. The apertures 100 are arranged in pairs. The forward bar 78 has an aperture disposed in alignment with the aperture on the rear bar 78 and sufficient of such apertures are provided for receiving the cores 94 of the solenoids. Any suitable number of solenoids may be used.

As best shown in Figure 2 the solenoids are wired each with one of its terminal wires 106 joining a common wire 110. The common wire 110 is grounded as shown at 112.

The opposite terminal wires 120 of each solenoid 92 are connected to common wire 130 which extends forwardly through the forward part of the trailer 12 under the cab of the truck and up to a switch 140 on the dashboard of the truck within reach of the operator. The opposite terminal switch 140 is attached by the wire 142 to one side of the truck battery 150, the other side of the truck battery being grounded by a wire 152.

As thus described it will be seen that in event of hydraulic brake failure or if the road is too icy for sufficient braking the operator can press the button 140 causing the solenoids 92 to pull their cores 94 from the apertures 100 whereby the mat 60 is free to drop to the ground and to move into the position shown in Figure 1 beneath the wheels 20 of the trailer. In this position the mat will provide greater traction for preventing the trailer from jackknifing and also for better brake traction.

After its emergency use, the mat 60 can be replaced in its original position by backing the truck away from the mat and placing the forward end of the mat back onto the yoke made by the bars 78.

Another modification of the safety device of this invention is shown in Figures 4, 5 and 6. As seen in Figure 4, the rear wheels of a truck are shown at 200 disposed on the surface of the ground 210. The wheels 200 are disposed beneath a truck, a portion of which is shown at 212.

In accordance with this invention an I-beam or other transverse member 218 is attached to the under side of the truck in any suitable manner.

A pair of pivoting arms 236 are secured to each end of the rearward vertical portion of the transverse member 218 by supporting and spring mounting brackets 220. These brackets are secured by means of bolts 222 which extend horizontally forward through apertures in the transverse member 218 and in a fishplate 224.

The spring mounting portion of each bracket 220 may be described as having a short horizontal rearwardly extending arm 226 which projects vertically downward at a right angle at its rearward end. A cylindrical protrusion 232 is provided over which one end of a coiled compression spring 234 is held in position.

Each of a pair of normally vertical swinging arms 236 have a transversely disposed aperture 238 through their upper ends, the aperture is axially aligned with a pin 240 which extends horizontally transversely through an aperture in the spring mounting bracket 220.

Two rectangularly shaped braking plates 244 are secured by suitable means, one on each of the lower rearward vertical portions of the arms 236. The plates 244 extend slightly below the lower end of the normally vertical arms 236.

A plurality of U-shaped brackets 246 are secured three on each of the two braking plates 244 and are spaced one on each end and one in the center directly below the lower end of the arm 236.

The U-shaped brackets 246 are secured to the braking plates by welding their upwardly extending side portions to the lower rearward and forward vertical portions of the braking plates 244.

When the brackets 246 are so secured they leave a transverse opening through which passes one of a plurality of parallel elongated transversely disposed rods 262.

The rods 262 are equally spaced apart and are held in their parallel positions by steel chain links 264. The chain links 264 are positioned in a staggered pattern serving to strengthen the mat-like portion of the device.

The lowest rod 262 is pivotally attached by a clevise 270 to ground engaging members or plates 280.

The plate 280 has an elongated frame main body portion for extending beneath the wheel 200 in engagement with the roadway 210. The main body portion 280 is rough on its upper surface 282 for providing greater friction against the tire 200. This can be accomplished by any suitable means such as a plurality of transverse grooves 283.

The lower surface 288 of the plate 280 is also rough for better traction on the road surface. It can be made rough by a plurality of transverse grooves 289 or by any other suitable means.

The forward portion of the plate 280 is upwardly curved in an arc and is there secured by the clevises 270 to the rod 262.

On the forward side of the downwardly extending arms 236 a yoke member or supporting member generally indicated at 290 is provided. The yoke member 290 is welded or otherwise secured to the arm 236 and has a portion 292 extending forwardly supporting two downwardly extending portions 294 which are spaced apart forwardly and rearwardly of one another for receiving therebetween the outermost one of the rods 262. The portions 294 are provided with aligned apertures for receiving the core 300 of a solenoid generally indicated at 320. The solenoid 320 is mounted upon a suitable bracket 323 which is thus attached to the forward side of the arm 236 beneath and spaced from the yoke member 290. The solenoid core 300 extends forwardly from the solenoid coil 324 and is removably disposable through the apertures in the yoke portions 294 beneath the rod 262, as best shown in Figure 5. The plate 280 is provided with notches 330 on either side thereof adjacent the clevises 270 for the purpose of receiving therethrough the cores 300 of the solenoid 320.

A coiled compression spring 340 is disposed on the core 300 adjacent the solenoid coil 324 and between the solenoid coil 324 and the rearward downwardly extending yoke portion 294. The coil spring 340 engages a handle 350 at its forward end, the handle 350 being attached to and extending outwardly from the solenoid core 300.

The solenoid coil 324 has wires 360 and 364 extending outwardly therefrom for a purpose now to be described. The wire 360 is grounded, by means not shown, in the manner of the terminal wires 106 of the solenoid 92 in the modification of Figure 1.

The wire 364 leads to a switch 140 similarly to the wiring diagram in Figure 2, the switch 140 leading to the battery 150 and the other terminal of the battery 150 leading to the ground by the wire 152, all identically as shown in the wiring diagram of Figure 2. Because the wiring diagram for the solenoid 324 is the same as for the solenoid 92 in Figure 2, a separate wiring diagram for Figures 4, 5 and 6 is not here shown.

In operation, it will be seen that in event of emergency, the operator can press the switch 140, causing the solenoid 324 to pull the core 300 rearwardly, freeing the outermost rod 262 for permitting the plate 280 to drop and to assume the position shown in dotted lines in Figure 4.

In Figure 4 it will be seen that the plate 280 will provide traction on the ground 210 and will slow the wheel 200 due to the friction thereon by engagement of the plate 280 with the wheel 200 as well as by engagement of the links 264 and the plate 244 with the wheel 200.

When the emergency is over the operator can back the truck up and replace the parts in the full line position shown in Figure 5 by pushing rearwardly on the handle 350 for retracting the solenoid core 300 from the yoke member 290 during insertion into the yoke 290 of the outermost rod 262.

From the foregoing description, it is thought to be obvious that a trailer safety device constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

I claim:

1. A safety device for use with a vehicle having rear wheels and a driving compartment, comprising at least one swingable arm having an upper end pivotally attached to the underside of said vehicle in front of said rear wheels; a yoke member secured to said swingable arm and having spaced apart portions having aligned apertures; a solenoid having a core removably disposable through said apertures, said solenoid being mounted on said swingable arm; means for control of said solenoid; a road engaging member disposable between said rear wheels and the surface of the road; and means including a flexible member for attaching the lower end of said swingable arm to said road engaging member and adapted to be releasably upheld in said yoke by said core.

2. A safety device, for use with a vehicle having rear wheels and a driving compartment, comprising at least one swingable arm having an upper end pivotally attached to the underside of said vehicle in front of said rear wheels, a yoke member secured to said swingable arm and having spaced apart portions; a road engaging member disposable between said rear wheels and the surface of the road; and means including a flexible member for attaching the lower end of said swingable arm to said road engaging member, and releasable means for holding said flexible member in said yoke for upholding said road engaging member and for the release of said road engaging member for movement into a position beneath said wheel.

References Cited in the file of this patent

UNITED STATES PATENTS

| 1,313,103 | Mahoney | Aug. 12, 1919 |
| 2,174,135 | Parrish | Sept. 26, 1939 |
| 2,224,785 | Greene | Dec. 10, 1940 |
| 2,252,878 | Bella et al. | Aug. 19, 1941 |
| 2,562,521 | Blattner | July 31, 1951 |

FOREIGN PATENTS

| 411,176 | Great Britain | June 7, 1934 |